Sept. 17, 1940.   G. S. LANE.   2,214,744
BRAKE ADJUSTMENT
Filed April 10, 1936   2 Sheets-Sheet 1
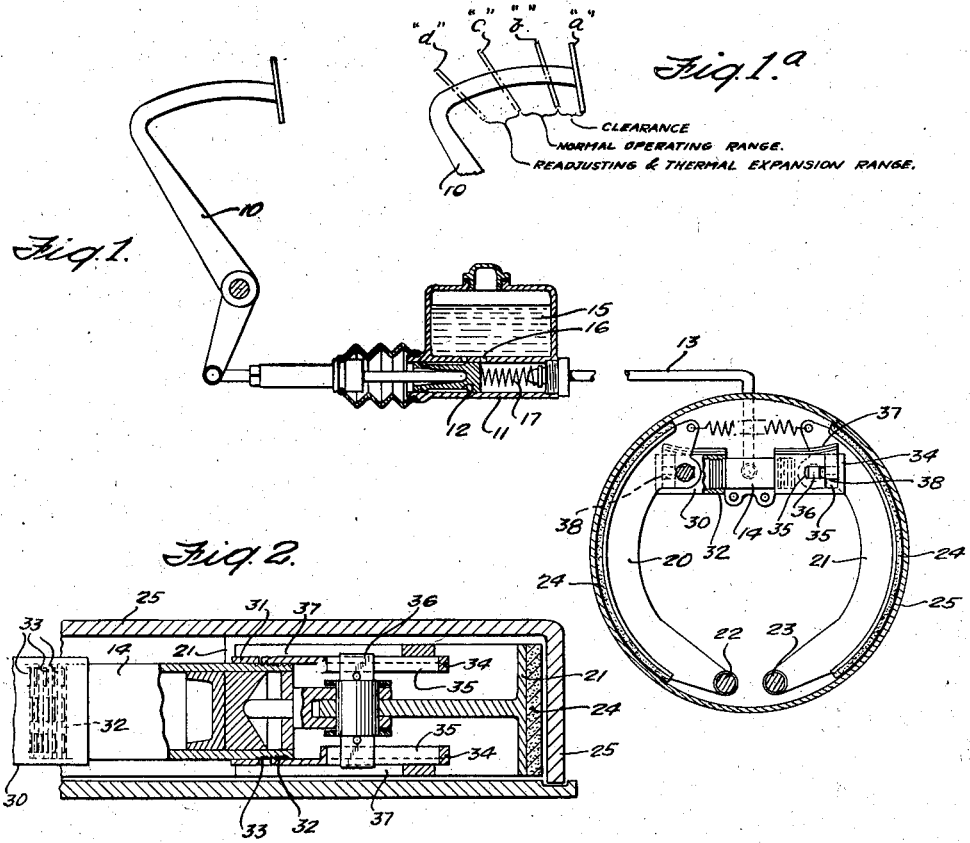
INVENTOR
GEORGE S. LANE
BY
ATTORNEYS

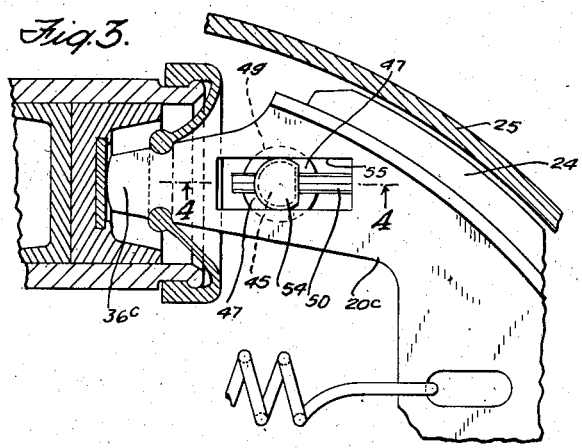
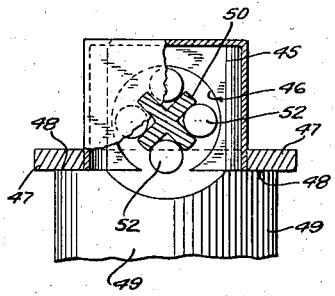
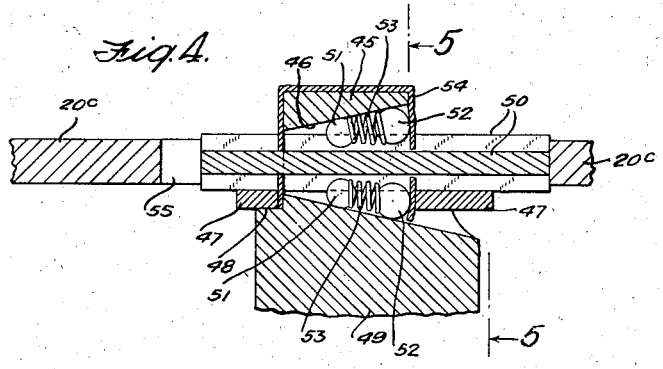
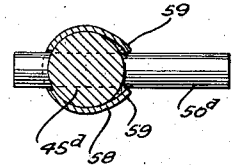
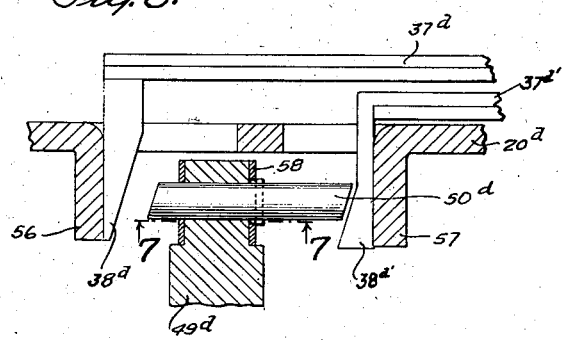

Patented Sept. 17, 1940

2,214,744

UNITED STATES PATENT OFFICE 2,214,744

BRAKE ADJUSTMENT

George S. Lane, Schenevus, N. Y.

Application April 10, 1936, Serial No. 73,703

3 Claims. (Cl. 188—79.5)

This invention relates to brake mechanisms and more particularly to devices and methods for automatic adjustment of brake mechanisms to compensate for wear, which will avoid false adjustments due to thermal expansion upon overheating of the parts.

In my prior application, Serial No. 65,049, filed February 21, 1936, I have disclosed devices and methods for automatic adjustment of brake mechanisms which embody means for controlling the adjustment so as to avoid false adjustment due to thermal expansion of the drum.

It is an object of my present invention to provide simple and efficient automatic adjusting devices for brake mechanisms which will be safe against false adjustment due to heating of the brakes in service. Another object of the invention is to provide a device of the general character set forth in my said prior application Serial No. 65,049, and for the purposes therein set forth, which will be of improved construction and design.

In the brake mechanisms which are now in common commercial use the mechanism is operated by a force applying member, such as a pedal or fluid pressure or electric motor, having a limited stroke. A small portion of this stroke in existing brake mechanisms is used to take up the slack due to normal cold clearances in the mechanism, that is to say to bring the parts into their initial effective relation. A second portion of the stroke is used for the effective pressure on the operating parts and the remainder of the possible stroke is left unused to accommodate additional slack resulting from thermal expansion and wear before readjustment becomes necessary. One of the serious causes of accidents is that the need for readjustment of brakes may not become apparent until an emergency stop is necessary from high speed or on a hill; then the overheating which results may so far expand the drums as to make the brakes ineffective. Accordingly another object of my invention is to provide for maintaining at all times sufficient leeway in the brake operating mechanism to assure effective operation regardless of heating.

In the design of brake mechanisms prior to my invention every effort has been directed toward reducing the slack, that is to say the clearances of the parts so as to reduce the amplitude of pedal movement consumed in the initial taking up of slack. It has been recognized as desirable to use as much as is practicable of the pedal movement for actually applying pressure to the operating parts, but the extent to which this could be accomplished has been limited by the necessity for providing a substantial unused amplitude for accommodating wear before readjustment.

Automatic take-up devices have been proposed prior to my invention in order that the amplitude of pedal movement required for accommodating wear could be reduced with corresponding increase of the amplitude available for actual application of pressure but such devices have failed of this purpose because the excessive pedal movement when the brake is heated causes them to readjust the brakes as though wear had occurred, and upon cooling the brakes are then locked.

The full utilization of pedal movement for effective application of the brakes can be fully achieved by use of thermostatically controlled automatic take-up devices.

When thermostatic control is provided according to my invention for the adjusting device, the adjusting position is at the end of the normal operating range and a further pedal range is provided for thermal expansion and readjustment. Thus the readjustment occurs in small increments immediately as the wear occurs. The mechanism is kept constantly in substantially perfect adjustment, and that part of the pedal movement which heretofore has been reserved for accommodating wear can now be used for effective operation, giving greater mechanical advantage.

When the thermostatic control member is behind the shoe or otherwise removed from intimate heat exchange relation with the drum, so that the thermostatic adjustment lags behind the drum expansion the thermostat may be designed to overcompensate slightly. Under the most severe driving conditions this may result in the brakes being allowed to wear a little more before readjustment, but such conditions are almost never maintained continuously for periods sufficient to produce dangerous wear, and the prevention of excessive adjustment during the "lag" period of the thermostat may be more important. This problem, of course, does not exist if the thermostat is placed (e. g., as in Fig. 6) close to and for direct radiation from the drum.

In the accompanying drawings I have shown a preferred embodiment of my invention and various modifications thereof which are designed to achieve the above objects and advantages both with and without thermostatic regulation.

The examples shown in the drawings are not intended to be exhaustive or limiting but on the contrary have been chosen with a view to illustrating my invention and the principles involved therein and to instructing others skilled in the art so that they may apply and utilize the invention under varying conditions and embody it in various forms according to the particular requirements of each case. It will be understood, therefore, that the invention is in no way limited to these particular examples illustrated.

Fig. 1 is a diagrammatic view partly in section and partly broken away of an automotive brake system.

Fig. 1a is a diagrammatic view indicating the parts of the pedal stroke which are assigned to the various functions performed by the pedal.

Fig. 2 is a fragmentary view partly in horizontal axial section through the brake operating motor and the adjacent parts shown in Fig. 1.

Fig. 3 is a fragmentary view showing in elevation a modification which may replace the corresponding parts shown in Fig. 1.

Fig. 4 is a fragmentary section taken on line 4—4 of Fig. 3.

Fig. 5 is a section taken on line 5—5 of Fig. 4.

Fig. 6 is a fragmentary view, partly in section, of a modified construction similar to that shown in Figs. 3 to 5 inclusive.

Fig. 7 is a top plan view of the ratchet device shown in Fig. 6, taken along the section line 7—7 of Fig. 6.

In Fig. 1, I have shown diagrammatically a conventional hydraulic brake mechanism to which my invention has been applied. The foot pedal by which the brake is operated is represented at 10. The master cylinder 11 contains a piston 12 operated by the foot pedal and communicates at one end with the pressure line 13 by which it is connected to the fluid pressure motors 14 at the wheel brakes. A reservoir 15 above the cylinder 11 carries an additional supply of pressure fluid; and, in order that the system may at all times be kept filled with the fluid, this reservoir communicates with the cylinder 11 through the breather opening 16, whenever the piston 12 is in the retracted position. The spring 17 in the master cylinder 11 holds the piston 12 in the retracted position whenever the foot pedal 10 is released and thus permits the readjustment of the liquid between the cylinder 11 and reservoir 15 and assures that the entire stroke of the pedal 10 will be communicated through the master cylinder to the fluid pressure motors 14.

In the example illustrated, a brake is shown in which primary and secondary shoes 20 and 21 are mounted on anchoring pivots 22 and 23. Each of these is faced with a brake lining material 24 which forms the actual surface of frictional engagement with the brake drum 25. The ends of the shoes 20 and 21 opposite to the anchors 22 and 23 are pivotally connected to the opposite piston rods of the fluid pressure motor 14.

Thus far the system is a conventional one in common use in motor cars of standard commercial manufacture. According to my invention, this system is modified by placing over one or both ends of the motor 14 a stop member 30. This stop member is provided with a tubular end 31 adapted to fit snugly over the outside of the motor cylinder 14. The end of the motor cylinder is provided with ratchet grooves 32 and the sleeve 31 is provided with ratchet detents 33, which may be merely portions of the metal stamped from the sleeve and turned inwardly to engage in the ratchet grooves. These detents are preferably positioned in a vernier arrangement as shown, i. e., so that upon movement of the sleeve 31 a distance less than the width of one groove 32 a different tooth 33 will engage and hold the new position and almost any position can be held substantially exactly by one tooth aligning itself with one groove.

Beyond the sleeve 31 the member 30 is extended in two stop fingers 34 slotted as shown at 35. Within the slot 35 is an extension 36 on the pivot through which the piston rod engages the brake shoe 20.

A bimetallic thermostatic strip 37 is secured to the sleeve on the side toward the brake drum and carries at its opposite end a catch 38 which at normal temperatures is held in the path of the extension 36. The surface of this thermostatic strip which is toward the brake drum is preferably blackened and/or roughened to improve the efficiency of its heat exchange therewith.

In the operation of this device any normal use of the brake before excessive wear has occurred takes place while the pivot 36 is within the scope allowed in the slot 35 by the stop 38. As soon as the wear on the lining and on the inside of the drum has progressed to such an extent that the pivot 36 tends to go beyond the scope allowed by the slot 35 then the pivot contacts the catch 38 and pulls the member 30 over the motor cylinder 14 until one of the detents 33 has engaged in another groove 32.

After this the full return of the piston rod is prevented because the pivot 36 contacts against the ends of the slot 35.

When the panel 10 returns to its normal position there will not be enough fluid to fill the system because of the fact that the piston rod is now held out by the member 30 so that it leaves a larger space in the motor cylinder 14. This, however, is immediately taken care of by an inflow of fluid from the reservoir 15 through the breather opening 16; and thereafter the brake will operate with the same amplitude as before, but beginning from the new position established by the stop member 30. Although the foot pedal 10 is operated through the same range of movement, the corresponding movement of the brake shoes is automatically advanced toward the drum to compensate for the wear.

This adjustment progresses step by step as the lining wears.

If, however, the pivot 36 moves substantially beyond its normal range because of thermal expansion of the brake drum, no corresponding adjustment of the member 30 will result because at the same time, the thermostatic finger 37 will have been heated from the drum and consequently will have flattened enough to remove the catch 38 from the path of the pivot 36.

In Fig. 1a, I have illustrated how the operating range of the pedal 10 is divided between the various functions performed in this mechanism. The fully released position is shown in full lines, as in Fig. 1, and is indicated by the small letter a. The position at which the effective operation of the brake begins is shown in broken lines and indicated by the letter b. The position at which effective operation should be complete, that is to say the maximum operation of the brake, is indicated at c. At this same position readjustment by operation of the take-up device begins if wear has occurred so that operation of the brake is not complete; or, if the brake is overheated so that the stop 38 is removed from the path of the stop member 36, then the range from c to d serves merely to accommodate normal operation under conditions of thermal expansion.

In Figs. 3, 4 and 5 I have shown another construction which adapts itself very simply to the brake equipment used in many of the current standard models of American automobiles. In these standard models the brake shoe bears against a stud just inward from the end, at which the brake operating motor is connected to the shoe. In the case illustrated in Figs. 3 to 5, I have provided an extension 45 on such a stud 49. This extension 45 is drilled and countersunk as shown at 46.

A washer 47 is slipped over the extension 45 and against the shoulder 48 on the stud 49. This washer provides the bearing for the brake shoe 20c which the stud in the present design is intended to provide.

A pin 50 having symmetrically spaced grooves is slipped through the hole 46 and balls 51 and 52 are positioned in the grooves and within the hole 46 and spaced from one another by a spring 53. A spring cap 54 fits over the extension 45 and by engaging the outer balls 52 holds them resiliently in place.

An elongated hole 55 is cut in the web of the brake shoe 20c so that it allows a play of the shoe between positions of contact with the opposite ends of the pin 50, sufficient to accommodate the normal operating movement of the brake.

In the operation of this device the balls 51, 52 form with the pin 50 a silent ratchet, that is to say a device in which the pin 50 may be moved in one direction but not in the opposite direction. Upon operation of the brake the shoe 20c is normally moved until the end of the opening 55 just contacts with the ends of the pin 50. If wear has occurred, however, the shoe will move beyond this point and will move the pin 50 through the stud 49 to a new position. Upon the return of the shoe to the released position it will then contact at the opposite end of the opening 55 against the pin 50 and will be held against full return so that additional liquid will enter the system through the opening 16.

In the case illustrated in Figs. 3 to 5 no provision is shown for thermostatic operation. An additional thermostatic member should therefore, be provided as shown for example in Fig. 6.

Figs. 6 and 7 illustrate an arrangement very similar to that shown in Figs. 3 to 5. In this case, however, instead of the extension 45 extending through an opening in the shoe 20c, the shoe 20d in this case is provided with ears 56 and 57 turned down so as to form stops having the same function as the ends of the opening 55 in the shoe 20c. The pin 50d in this case is engaged by a cylindrical spring 58 which is fitted to the extension 45d and which has two portions 59 cut back so as to form engaging fingers.

The pin 50d slides easily to the right between these fingers 59, but when an attempt is made to push it in the opposite direction the fingers are crowded against one another and only bite more securely against the pin 50d. This, therefore, provides a silient ratchet construction to replace the ball arrangement shown in Figs. 4 and 5.

In this case I have provided a thermostatic adjustment 37d, 38d. The strip 37d is a bimetallic strip secured at one end to the shoe and adapted to lift away from the shoe when heated. Thus it withdraws the wedge member 38d. Because of the wedge shape of this member the position at which the pin 50d is contacted by the shoe is varied gradually according to the temperature. Obviously, instead of the wedge member, a simple parallel sided member could be used with an effect similar to that of the member 38 shown in Fig. 1, i. e., to render the taken-up device inoperative at least for a substantial distance beyond the normal adjusting position. The width of this removal member in such case should preferably be substantially equal to the movement of the shoe resulting from maximum thermal expansion.

The thermostatic member 37d–38d provides against false adjustment due to thermal expansion but alone does not provide for temporary adjustment to compensate for thermal expansion. For this latter purpose a second thermostatic member 37d'–38d' may be provided at the opposite end of the pin 50d with the wedge member 38d' inverted with respect to the member 38d or with the thermostatic strip 37d' inverted with respect to the strip 37d so that in either case the clearance between the stop members 38d and 38d' respectively and the pin 50d is increased at one end as it is decreased at the other.

A thermostatic control of this kind can be added to or omitted from any of the constructions of Figs. 3 to 5.

As will be understood by those skilled in the art, the constructions shown in the figures may also be used in mechanical brake operating systems by placing a suitable ratchet device in the brake linkage between the pedal and the stop members shown in the above described figures.

Numerous other changes and modifications may be made as will readily be understood by those skilled in the art. For example, whereas in some cases I have shown a fixed abutment with spaced portions on the movable member to engage the abutment at the beginning and end of the stroke and in other cases have reversed this arrangement using the spaced members on the fixed abutment and a single movable member between them, it will be understood that these are alternative arrangements and are not necessarily tied up with the particular embodiment in which they are shown.

Again, although I have shown in some cases click ratchets and in other cases silent ratchets it will be understood that these may in general be interchanged.

I claim:

1. The combination of a brake mechanism, an automatic take-up adapted normally to make permanent adjustment to compensate for wear when a part of the brake mechanism is moved beyond a predetermined limit, said take-up comprising means adapted to engage a part of the brake mechanism at said limit and to be moved thereby to effect readjustment, a wedge member on the face of one of said engaging parts, and thermostatic means responsive to overheating of the brake to move said wedge transversely to the direction of engagement whereby to vary the position of the mechanism at which engagement occurs according to the temperature of the brake and thereby to compensate at least partially for thermal expansion.

2. The combination as defined in claim 1 in which the means responsive to the temperature of the brake comprises a bi-metal member secured to the shoe and adapted upon heating to deflect so that a part thereof is lifted from the shoe and thereby to stop the retraction of the shoe at a more advanced position.

3. In an hydraulic brake system including a friction shoe adapted to engage a brake, hydraulic shoe operating means, an abutment to limit retraction of the shoe, and means for replenishing the liquid in the hydraulic means when in its relased condition, bi-metal means adapted, by deflection in response to heating, to move between the shoe and abutment so as to reduce the effective clearance therebetween.

GEORGE S. LANE.